(12) United States Patent
Schulnig (10) Patent No.: US 9,193,538 B2
(45) Date of Patent: Nov. 24, 2015

(54) GRIPPING ARM FOR A GRIPPER DEVICE

(71) Applicant: Tyrolon-Schulnig GmbH, Hochfilzen (AT)

(72) Inventor: Elmar Ludwig Schulnig, Fieberbrunn (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 0 days.

(21) Appl. No.: 14/186,692

(22) Filed: Feb. 21, 2014

(65) Prior Publication Data

US 2014/0238825 A1   Aug. 28, 2014

(30) Foreign Application Priority Data

Feb. 25, 2013   (EP) .................................... 13156514

(51) Int. Cl.
*B65G 47/86* (2006.01)
*B65G 47/90* (2006.01)
*B65G 37/00* (2006.01)

(52) U.S. Cl.
CPC ................ *B65G 47/90* (2013.01); *B65G 37/00* (2013.01); *B65G 47/847* (2013.01); *B65G 2201/0244* (2013.01)

(58) Field of Classification Search
CPC .................................................... B65G 47/847
USPC .................. 294/106, 110.1, 110.2, 116, 902; 198/803.7, 803.9
See application file for complete search history.

(56) References Cited

U.S. PATENT DOCUMENTS

| 4,304,433 | A  | * | 12/1981 | Langowski ................... 294/106 |
| 6,691,860 | B2 | * | 2/2004  | Osterfeld et al. .......... 198/468.2 |
| 7,434,857 | B2 | * | 10/2008 | Nakajima et al. ............. 294/116 |
| 8,191,948 | B2 | * | 6/2012  | Preti et al. ..................... 294/116 |

(Continued)

FOREIGN PATENT DOCUMENTS

| CN | 1140693 A   | 1/1997 |
| CN | 101151105 A | 3/2008 |

(Continued)

OTHER PUBLICATIONS

European Search Report, European Application No. 13156514.5-1708, Applicant: Tyrolon-Schulnig GmbH, Date of Mailing: Aug. 27, 2013, pp. 1-7.

(Continued)

*Primary Examiner* — Douglas Hess
(74) *Attorney, Agent, or Firm* — Cesari and McKenna, LLP; James A. Blanchette (57) ABSTRACT

A gripper arm for a gripping device for grasping, holding and guiding containers, comprises at least one rotatably mounted control cam, the control cam designed and disposed such that the gripper arm can be moved from at least one first position into at least one second position and/or vice versa, wherein the gripper arm comprises at least one bore hole for at least partially receiving a bearing pin, wherein the bearing pin is designed such that the gripper arm can pivot in the gripping device, and wherein the gripper arm further comprises at least one seating for a closing means configured such that it can move the gripper arm from the second position into the first position and/or vice versa, and wherein the gripper arm comprises at least one gripping section at least partially of fork-like form. A gripping device, a transport mechanism and a transport system is also provided.

15 Claims, 5 Drawing Sheets

(56) References Cited

U.S. PATENT DOCUMENTS 8,602,471 B2 * 12/2013 Bodtlander et al. .......... 294/192
8,833,824 B2 * 9/2014 Fahldieck ....................... 294/90
8,894,114 B2 * 11/2014 Fahldieck ....................... 294/90

FOREIGN PATENT DOCUMENTS

| CN | 201665436 U | 12/2010 |
| DE | 20305988 U1 | 8/2003 |
| DE | 102008019766 B3 | 4/2009 |
| DE | 102009005151 A1 | 7/2010 |
| DE | 102009018731 A1 | 10/2010 |
| EP | 1595827 A1 | 11/2005 |
| EP | 1868746 B1 | 5/2009 |
| EP | 2159172 A1 | 3/2010 |
| EP | 2248759 A1 | 11/2010 |
| EP | 2548824 A1 | 1/2013 |
| WO | WO-2012/123566 A1 | 9/2012 |

OTHER PUBLICATIONS

"Translation of First Notification of Office Action," Chinese Application No. 201410059758.2, Applicant: Tyrolon-Schulnig GmbH, The State Intellectual Property Office of P.R. China, Sep. 1, 2015, pp. 1-19.

* cited by examiner

GRIPPING ARM FOR A GRIPPER DEVICE

RELATED APPLICATIONS

The present application claims priority to European Patent Application No. 13156514.5 filed Feb. 25, 2013, by Elmar Ludwig Schulnig for a "Gripping Arm for a Gripper Device", which is incorporated by reference herein in its entirety.

BACKGROUND

1. Technical Field

The present disclosure relates to a gripper arm for a gripping device for grasping, holding and/or guiding in particular small and round containers as well as a gripping device, a transport mechanism and a transport system.

2. Background Information

Gripping devices for grasping, holding and/or guiding in particular small and large (albeit not exclusively round, but also oval, uniformly polygonal, etc.) containers are already known in the prior art and are used in assembly line container processing operations.

As used in the following, the term "container" refers in particular, but not solely, to small and round containers, particularly those having a circular cross section, e.g. small bottles or cans made of glass, metal or plastic.

Particularly when cleaning, filling or sealing, the containers are grasped at an infeed station by a gripping device having at least one pair of gripper arms and transported to the next station in the process. Such a gripping device for a container transport system has two gripper arms and can alternate between a gripping position and an open position. In order to transport a container, the gripper arms normally grasp underneath the collar of the neck or, particularly in the case of small bottles, around the body of the container. An opening means is normally provided to open and close the gripping device.

The gripper arms of a gripping device normally grasp a bottle to be transported underneath the collar of the bottle's neck or around the body of the bottle. While gripping the collar of the bottle's neck allows a container to be stably guided, gripping, and thus guiding, from the body of the bottle is less stable due to the higher center of gravity and the lack of a collar. This is especially the case with elongated and/or filled containers. While the skilled person knows that using a plurality of gripper arm pairs to hold a container will have a stabilizing effect, because of the multi-part components involved, doing so increases the complexity of a gripping device, and hence its manufacturing, maintenance and cleaning expenditures. The impurities which collect on the gripper arm pairs is disadvantageous, particularly in the case of hygiene-sensitive processes such as bottling milk or baby food. Impurities thereby accumulate particularly in recesses in and/or between the components.

Hence, operating a gripping device as known in the prior art gives rise to either stability problems when holding and guiding containers or increased manufacturing, maintenance and cleaning expenditures, which has proven disadvantageous particularly when used in sectors such as the industrial filling of beverage or juice bottles. Solving in particular the above cited problems is thus desirable.

SUMMARY

A gripper arm for a gripping device, as well as a gripping device, a transport mechanism and a transport system, is disclosed that has the effect of greatly reducing the tendency of the gripper arm and the gripping device of becoming contaminated, as well as having the gripper arm and the gripping device being able to stably hold and guide especially elongated containers.

It is provided for a gripper arm for a gripping device for grasping, holding and guiding in particular small and round containers to comprise at least one rotatably mounted control cam, whereby the control cam is designed and disposed such that the gripper arm can be moved from at least one first position, particularly a gripping position, into at least one second position, particularly an open position, and/or vice versa by means of the control cam, or the rotation of the control cam respectively, wherein the gripper arm comprises at least one bore hole for at least partially receiving a bearing pin, wherein the bearing pin is designed such that the gripper arm can pivot, particularly can be pivotably mounted, in the gripping device, and wherein the gripper arm further comprises at least one seating for a closing means, wherein the closing means is configured such that it can move the gripper arm from the second position, particularly the open position, into the first position, particularly the gripping position, and/or vice versa, and wherein the gripper arm comprises at least one gripping section which is at least partially of fork-like form and in particular comprises at least two gripper fingers designed and configured so as to be capable of and can serve in holding a container in the gripping position.

Doing so in particular results in the advantage of greatly reducing the tendency a gripper arm and a gripping device has of becoming contaminated and also particularly of the gripper arm and gripping device being able to stably hold and guide elongated containers.

The multiple pairs of gripper arms regularly employed in conventional gripping devices are thus dispensed with, whereby a substantially more hygienic gripping device without contamination can be achieved. This results in considerably reducing the surfaces on which germs and contamination can gain purchase, particularly surface recesses between components.

This goes hand in hand with considerably reducing maintenance/repair proneness, since for the same number of contact points, multiple gripper arm pairs are no longer needed to grasp the container but instead just one single pair of gripper arms.

Additionally, due to the fork-like form of the gripping section and particularly the at least two gripper fingers at each gripper arm, the retention force of the gripping device on the container is distributed over a larger surface of the container and the container is thus stabilized during its guiding.

In a further embodiment, the gripper arm comprises at least one first hole as a seating for the closing means between the at least one bore hole and the at least one gripping section into which the closing means can be inserted during the assembly of the gripper arm. Due to the seating situated on the front side of the gripping device, the closing means can be relatively readily accessed, removed and replaced from the outside via the front of the gripping device. Hence, the gripper arm does not need to be taken off of the bearing pin. The frontal arrangement likewise enables simple maintenance or cleaning of dirt and dust from the spring. In addition, the seating formed as the first hole can be realized in a gripper arm without any great difficulties and, in at least one of the embodiments, no additional maintenance-prone fixing elements are needed for the closing means.

In order to provide a stable, economical and reliable closing means for the gripping device, the same advantageously comprises at least one tension spring which can be configured, inter alia, as a metal coil spring.

Preferably, the at least one seating is designed as a spring seat and comprises at least one second hole arranged perpendicular to the first hole into which the locking element for locking the at least one tension spring in the hole can be inserted. The locking element forms a compact, sturdy and simple fixing element, particularly in the form of a pin or the like, which can be guided from the upper side of the gripper arm into the at least one second hole of the seating arranged perpendicular to the upper side and prevent the closing means configured as a tension spring from withdrawing from the seating. To fix the spring in the seating using a pin-like locking element, one end of the spring is designed such that the locking element restricts the spring end's freedom of movement on the seating. In particular, the end of the spring is shaped like an eyelet or comprises a metal, plastic or rubber ring, whereby the end of the spring is positioned into the seating, particularly into the first hole, and the locking element inserted into the seating through the end of the spring. The end of the spring is not rigidly fixed or locked in the seating, but can instead have play and can be at least partially pivotable in order to offset the gripper arm movement from the open position into the gripping position and vice versa.

In addition, the gripper arm can advantageously be manufactured in a one-piece or integral plastic design, particularly from fiber-reinforced polyether ether ketone. Conventional gripper arms are made of stainless steel and are thus relatively expensive, whereby metal gripper arms are occasionally known to bend during the operation of such cited apparatus, said bending on the one hand being difficult to recognize during operation of the apparatus and, on the other hand, can lead to damaging the container to be grasped and transported and/or the oppositely disposed gripper arms to which the container is transferred or which receive the container respectively, and/or other fittings. When the gripper arms are made from plastic, however, they can be injection molded very economically as disposable items. Plastic moreover exhibits better properties for this use than stainless steel in that overloading the gripper arm does not lead to bending but instead to immediate breaking, which does not entail any consequential damaging of the bottle and allows the overloaded gripper arm to be immediately recognized. Due to its one-piece design, the gripper arm can then be very quickly and economically replaced. Fiber-reinforced polyether ether ketone (PEEK) has proven to be an advantageous plastic as it exhibits good rigidity coupled simultaneously with sufficient flexibility. PEEK is a highly temperature-resistant thermoplastic and the fiber reinforcement renders a fiber/plastic composite of high specific rigidity and firmness. Unlike conventionally used metals or stainless steel, plastic shows barely any signs of wear when cleaned with water. Yet because of the plastic used, even abrasive cleaning agents and higher temperatures can be used for sterilizing purposes. A gripper arm formed from plastic provides an easily replaceable product which can be disposed of without any problems after it wears out and can be replaced without great expense or long delivery times.

Arranging at least two gripper fingers of the gripping section parallel to each other has further proven to be advantageous. Doing so renders a better and more stable grip, particularly but not only around the body of a container. In particular, the retention force is distributed onto different points of a container's surface, where-by a form of tip-resistance also results during the transporting of the container.

With the objective of reducing the wear to the inner side of the gripper arm facing and interacting with the control cam, the gripper arm preferably comprises at least two locating pins arranged on one inner side of the gripper arm between the at least one bore hole and the at least one gripping section for the rotatable mounting of at least one seating collar each which can cooperate with the control cam in the conveying from the gripping position into the open position. The inner side of the gripper arm is the side of the gripper arm directed toward the grasped container in the gripping position. The opposite side of the gripper arm from its inner side is called the outer side of the gripper arm. When the at least one control cam now opens the gripper arm mechanism, the interaction does not subject the inner side of the gripper arm to load but rather at least one of the seating collars. The at least one rotatably mounted seating collar, which in particular comprises plastic or rubber, experiences less material abrasion on different sides due to the at least one control cam and additionally compared to an unprotected gripper arm inner side. This likewise ensures that the open position of the gripping device remains unchanged. Due to the frontal arrangement of the seating collar in the gripping device, the seating collars, similar to the above-cited springs, are easy to clean. The at least two locating pins are arranged separate from one another, although lie on a common axis and are parallel to the bore hole of the gripper arm. The seating collars can at the same time be arranged on the upper and underside of the gripper arm or on the inner side of the gripper arm. There is moreover one embodiment in which only one locating pin is configured and arranged on the at least one seating collar.

So that the gripper arms can move the gripping sections of the respective gripper arms as evenly as possible from the open position into the gripping position and vice versa, the gripper arm advantageously comprises at least one toothed section having at least segments of teeth arranged concentrically around the at least one bore hole on the inner side of the gripper arm for interacting, in particular synchronously pivoting, the gripper arm with a correspondingly arranged gripper arm in the device. The teeth of the two toothed sections of the gripper arm pair thereby engage. The shorter the teeth are, the closer the gripper arms of a pair of gripper arms are so that the teeth can engage. In addition, the force necessary to pivot the pair of gripper arms can be of continuously equal magnitude.

It is provided for the gripping device to be provided with at least one gripper arm, whereby the gripping device is a gripping device for grasping, holding and/or guiding of in particular small and round containers, wherein the gripping device comprises at least one rotatably mounted control cam, whereby the control cam is designed and disposed such that the gripper arm can be moved from at least one first position, particularly a gripping position, into at least one second position, particularly an open position, and/or vice versa by means of the control cam or the rotation of the control cam respectively.

The disclosure likewise relates to a gripping device having at least one inventive gripper arm, wherein at least two complementary gripper arms in particular form a gripper arm pair. This gripping device has the advantage of being a unit fully capable of grasping a container which, among other things, is fixed in a transport mechanism, and which can be replaced as a whole. In particular, a gripping device comprises at least one bearing pin, at least one control cam and at least one closing element arranged on at least one supporting unit.

It can in particular be provided for the gripping device to exhibit a pair of gripper arms comprising at least two gripper arms, whereby in particular at least two complementary gripper arms form a pair of gripper arms and/or that the at least one control cam is arranged between the at least two seatings of the gripper arm pair.

The present disclosure additionally relates to a transport mechanism. It is provided for a transport mechanism for transporting containers to be provided with one or more gripper arms.

In order to be able to flexibly adapt the transport mechanism, it is designed so that at least one further transport mechanism can be attached, particularly in a positive connection. A plurality of transport mechanisms can thereby be stacked atop each other and can be added or removed according to a company's usage and operating loads. The entire system thus does not need to be replaced in order to realize an adapting, instead just one additional transport mechanism needs to be ordered, delivered and added. The flexible adapting also enables the conveying of longer or larger containers by means of additional gripping devices provided by an additionally attached transport mechanism or an additional transport level can be provided for the containers.

Preferably at least one control cam of the transport mechanism can be coupled, plugged into or attached to at least one control cam of the at least one additional transport mechanism by means of at least one operatively connecting plug-in element. The plug-in element can be of bar, rod or dowel shape and can be positively fit or screwed into a control axis of the control cam. This simultaneous control of the gripping devices of the transport mechanism can bring the stacked gripping devices into an open position or gripping position at the same time and larger or longer containers can thus be held.

To keep the attaching and/or operatively connecting of two transport mechanisms as simple and uncomplicated as possible, components already being used for other purposes are designed so as to assist in the attaching or operatively connecting. In particular, the transport mechanism comprises at least one bearing pin and a central rotational axis for rotating the transport mechanism, whereby the at least one bearing pin and/or the rotational axis is/are designed to operatively connect to the at least one further transport mechanism. The bearing pin normally serves to pivotably mount the gripper arms by way of the bore hole and the central rotational axis to turn or rotatably support the transport mechanism. In order to attach the additional transport mechanism, said additional transport mechanism comprises recesses or bore holes which receive the rotational axis or the bearing pins of the pluggable clamping star. Using the bearing pins results in no further need for additional elements for the two clamping star connections, which reduces vulnerability as well as expenditure during production, operation and maintenance of the transport mechanisms. The additional transport mechanism is preferably only fixed on the rotational axis of the inventive transport mechanisms. The spacing of the two transport mechanisms is thereby configured in such a way that the bearing pins can pull the gripper arms of the inventive transport mechanism without the additional transport mechanism needing to be raised or the bearing pin removed from the inventive transport mechanism. The two transport mechanisms are preferably positively connected.

Advantageously, the transport mechanisms are arranged coaxially to one another and/or the stacked control cams have a common cam shaft. The coaxial arrangement enables all the transport mechanisms to be evenly and simultaneously rotated. The common cam shaft allows a simultaneous control of all the control cams stacked one atop the other.

Preferably each transport mechanism comprises at least one carrier plate each of like and/or different diameters. Depending on the container sizes and shapes, the gripping devices can be arranged at specific positions in order to grasp the containers.

The present disclosure additionally relates to a transport system. A transport system having a plurality of transport mechanisms is provided, wherein the transport mechanisms are arranged coaxially to one another and/or the stacked control cams have a common cam shaft.

It can moreover be provided for each transport mechanism to respectively comprise at least one carrier plate of like and/or different diameters.

The disclosure further relates to an inventive method for manufacturing an afore-mentioned gripper arm made of plastic in one piece in a injection molding process and completed by the insertion of two seating collars and one end of a spring.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
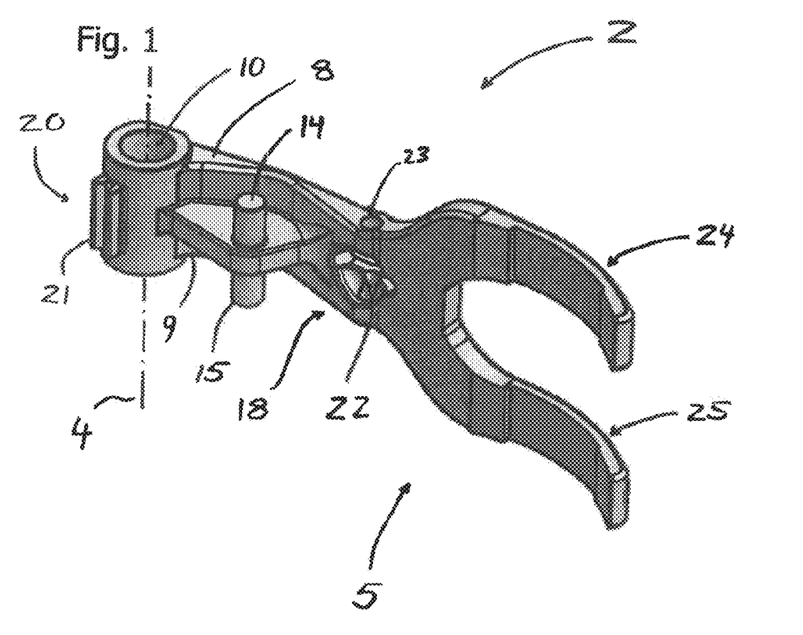
FIG. 1 is a perspective view of a first gripper arm.

The perspective view of FIG. 1 shows a first gripper arm 2. The gripper arm 2 is intended for a gripping device for grasping, holding and guiding of in particular bottle-like containers which comprises a rotatably mounted control cam 11 for moving a gripping section 5 of the gripper arm 2 from a gripping position into an open position. The gripper arm 2 comprises a bore hole 10 for supporting a bearing pin for the pivotable mounting of the gripper arm 2 in the device and a seating 18 for a—not shown in the figure—closing means for moving the gripping section 5 of the gripper arm 2 from the open position into the gripping position, wherein the gripping section 5 of the gripper arm 2 is of fork-like formation and comprises at least two gripper fingers 24 and 25 which serve to hold the container in the gripping position.

The gripper arm 2 comprises a first hole 22 as seating 18 for the closing means 6 between the bore hole 10 and the gripping section 5 into which the closing means can be inserted when the gripper arm 2 is mounted into a gripping device. The closing means is in particular configured as a tension spring 19. The seating 18 is configured as a spring seat and exhibits a second hole 23 arranged perpendicular to the first hole 22 in which a locking element (not shown in the figures) can be inserted to lock the tension spring 19 in the seating, particularly in the first hole 22. The hole 22 is arranged substantially perpendicular to bore hole 10 and extends from the inner side of the gripper arm to the outer side of the gripper arm. The inner side of the gripper arm is the side facing toward the container and the control cam 11. The outer side of the gripper arm is the side of the same gripper arm opposite from the inner side of the gripper arm. The second hole 23 is configured as a vertical bore from the upper side 8 of the gripper arm 2 to the first hole 22 and extends in particular beyond the first hole 22 toward the underside 9. Thus, a locking element in the form of a pin can be inserted from the upper side 8 into the second hole 23 and the closing means, particularly the spring, lock into the hole or prevent the removal out of the seating 18 respectively.

The gripper arm 2 is of one-piece plastic manufacture, particularly from fiber-reinforced polyether ether ketone. The at least one gripper fingers 24 and 25 of gripping section 5 are arranged parallel to one another and are in particular bent such that at least one or two points along the gripper finger interact with a container when in the gripping position. In particular, compared to the other points on the gripper finger, the two points have more material and/or are set off by less material on the other points so as to interact with the container when in the gripping position. In another embodiment, the gripper fingers 24 and 25 are removable and individually replaceable. They can also be arranged spread apart from each other and/or also aligned on a common point, converging or being connected at least at their tips respectively.

The gripper arm 2 comprises two locating pins 14 and 15 arranged on an inner side of the gripper arm between the bore hole 10 and the gripping section 5 for the rotatable mounting of a respective—not shown in the figure—seating collar 16 and 17 which can interact with the control cam 11 in the conveying from the gripping position into the open position. The locating pins 14 and 15 are formed from a bar configured on the inner side of the gripper arm, the height of which is less than the height between the upper side 8 and underside 9 of the gripper arm 2 and/or the bar is formed parallel to the upper side 8 and the underside 9. The height of the two seating collars 14 and 15 and the bar is preferably the same as the height between the upper side 8 and the underside 9 of the gripper arm 2. The locating pins 14 and 15 are in particular situated on a common axis arranged parallel to the pivot axis 4 of the bore hole 10. The gripper arm 2 comprises a toothed section 20 having at least segments of teeth 21 arranged concentrically around the bore hole 10 on the inner side of the gripper arm for synchronously pivoting the gripper arm 2 with a correspondingly arranged gripper arm in the device. The at least one or two teeth 21 are sequentially arranged around the pivot axis 4 and exhibit an involute toothing.

Figure 2:
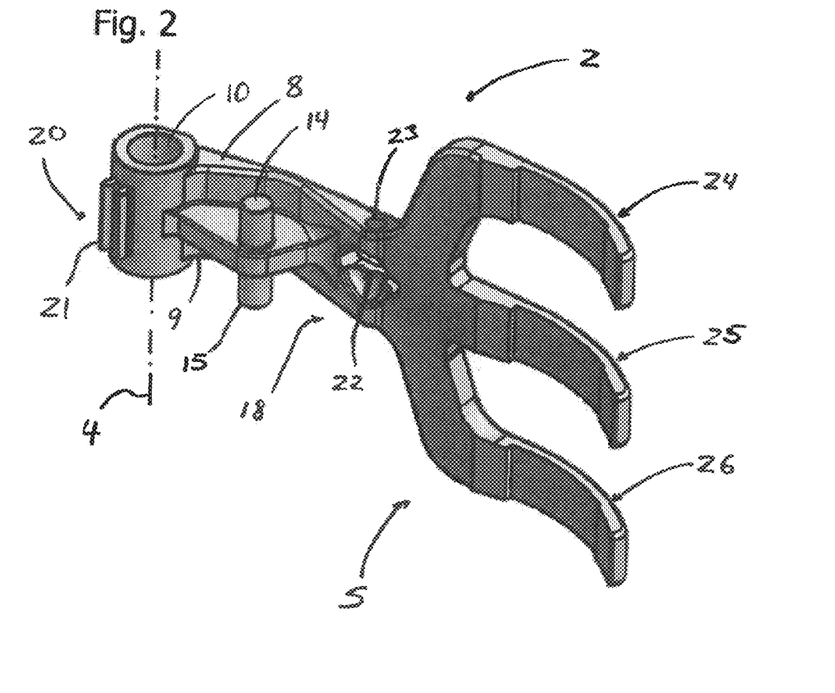
FIG. 2 is a perspective view of a second gripper arm.

FIG. 2 depicts a second inventive embodiment of the gripper arm 2 which only differs from the gripper arm of FIG. 1 in the number of gripper fingers. In FIG. 2, the gripper arm comprises three gripper fingers 24, 25 and 26. The height of the arrangement of the three gripper fingers 24, 25 and 26 is greater than the height of the arrangement of the two gripper fingers in FIG. 1. In addition, the distance between gripper fingers 24 and 25 as well as 25 and 26 in FIG. 2 is less than the distance between gripper fingers 24 and 25 in FIG. 1. In other embodiments, the distance between the gripper fingers can decrease downward, particularly toward the bottom of the container.

Figure 3:
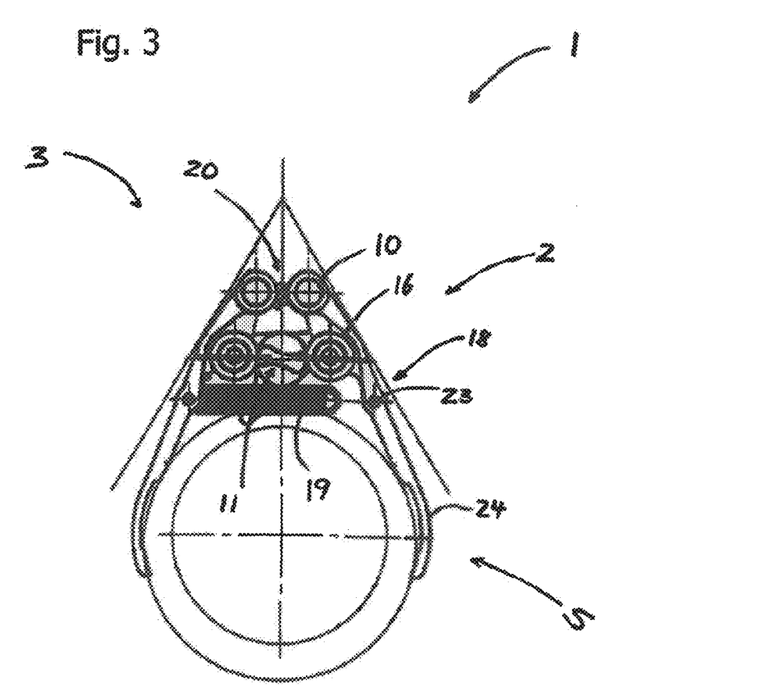
FIG. 3 is a plan view of a gripping device comprising two inventive gripper arms.

FIG. 3 shows a plan view of a gripping device composed of a first gripper arm 2 and a second corresponding gripper arm 3, wherein the gripper arms 2 and 3 correspond to a first, second or further embodiment. The toothed section 20 of the first gripper arm 2 interacts with the toothed section of the second gripper arm 3. The control cam 11 is arranged between the seating collars 16 and 17 of the respective gripper arms 2 and 3. The lower seating collar 17 is covered by the upper seating collar 16 and thus not visible in FIG. 3. As shown, the control cam 11 is in a position which maximizes the distance between the gripper arms 2 and 3 and thus holds the gripping device in an open position. For illustrative purposes, only one end of the spring 19, an embodiment of the closing means, is connected to one of the gripper arms. The seating collars 16 and 17 and the seating 18 are positioned and/or the spring 19 configured such that spring 19 neither contacts the control cam 11 nor the seating collars 16 and 17 in the open position as well as the gripping position and in particular does not cause any material abrasion in the seating 18.

Figure 4:
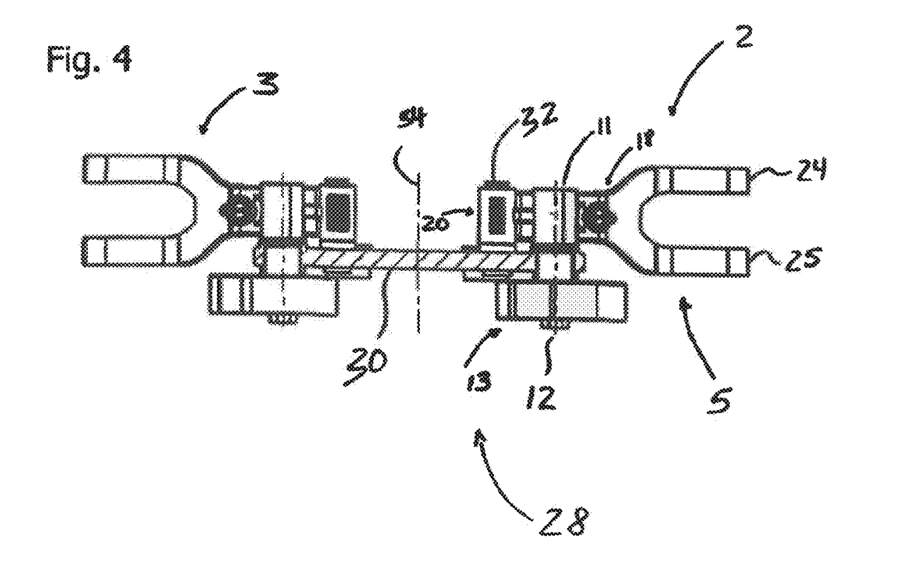
FIG. 4 is a cross section through a first transport mechanism.

FIG. 4 shows a cross section through a first transport mechanism 28, whereby the sectional plane passes through the center of a suppor-ting element 30. The supporting element 30 is configured as a circular flat plate. The central rotational axis 34 runs through the center of the supporting element 30 and perpendicular to the surface of the supporting element 30 so as to rotate the supporting element 30. The cross section runs through the rotational axis 34 and the control axis 12 of the control cam 11. Visible to the right of the rotational axis 34 is a gripper arm 2 in with its toothed section 20 and its gripping section 5 as well as seating 18. The gripper arm 2 is pivotably mounted to a locating pin 32. Correspondingly visible to the left of the rotational axis 34 is the corresponding gripper arm 3 of a further gripping device as well as its control cam. An activation element 13 fixed to the control axis 12 is arranged below the supporting element 30 which interacts with at least one—not shown in the figure—bolt, by means of which the activation element 13 and thus the control cam 11 is rotated for conveying the gripping device into the gripping position or into the open position. The activation element 13 is formed so as to not contact a grasped container and/or the gripper arm 2. In another embodiment, the activation element can be formed such that it pushes the container out of the gripping device 1 upon the gripping device 1 being conveyed into the open position so as to accelerate the delivering or release of the container.

Figure 5:
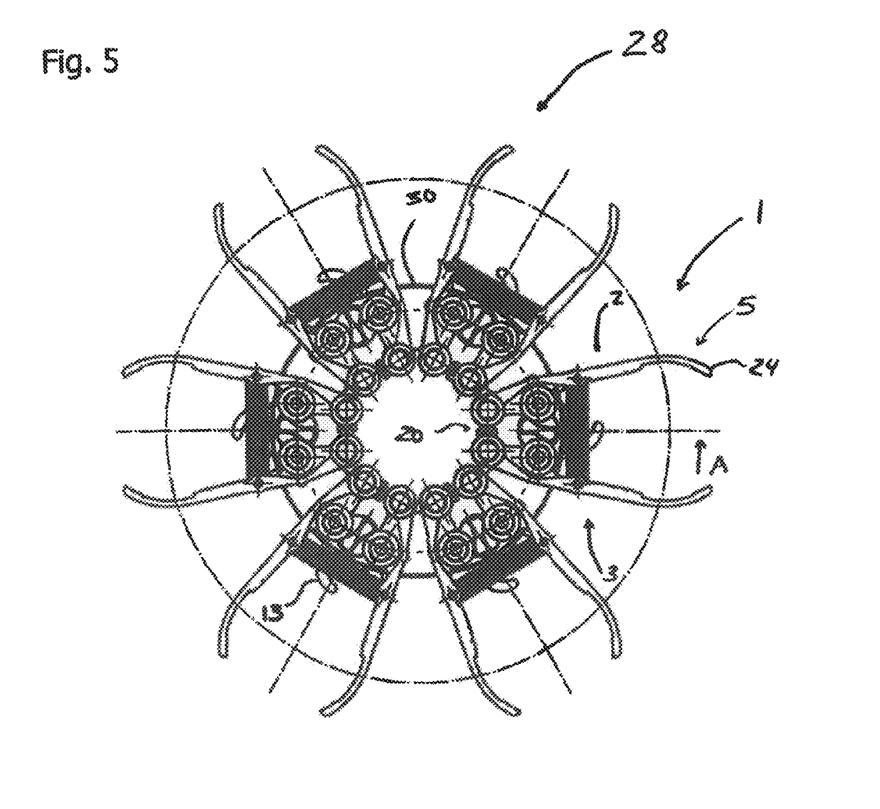
FIG. 5 is a plan view of the first transport mechanism.

FIG. 5 depicts the first inventive transport mechanism 28 with six gripping devices 1 in plan view. The view of the cross section from FIG. 4 is thereby identified by the reference character 'A'. The symmetrical axis of the gripping devices 1 arranged to the right and left of the center of the supporting element 30 lies in the cross-sectional plane. All the gripping devices 1 shown have an inventive gripper arm 2 as well as a corresponding inventive gripper arm 3 which cooperate with a control cam arranged between them and are moved into the gripping position by means of a closing means formed as a spring. All of the gripping devices 1 of the transport mechanism 28 are in the gripping position. While one gripper arm 2 exhibits a toothed section with two teeth 21, three teeth are formed in the toothed section of the corresponding gripper arm 3.

Figure 6:
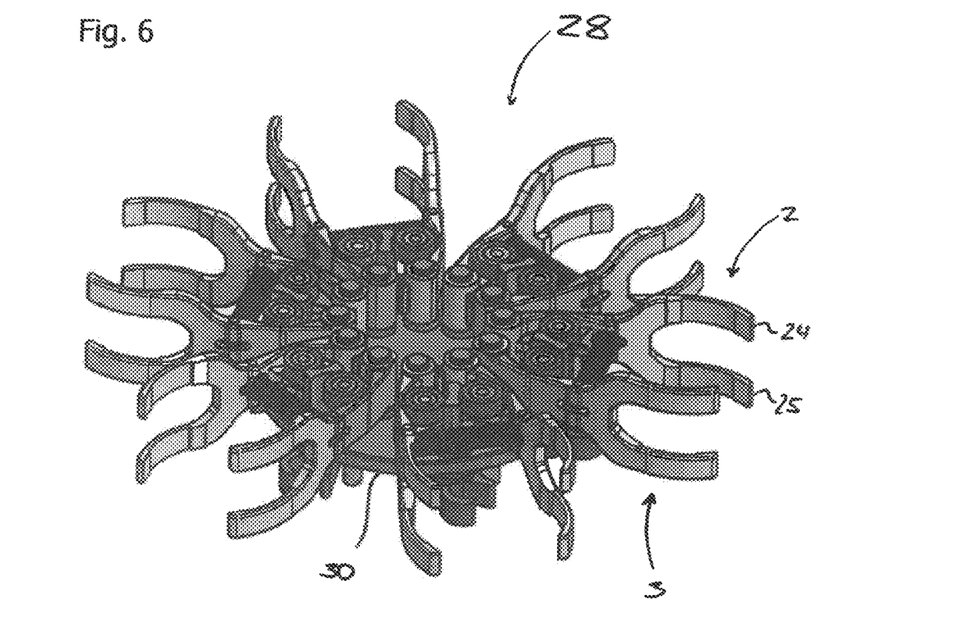
FIG. 6 is a perspective view of the first inventive transport mechanism having six gripping devices.

FIG. 6 shows a perspective view of the first inventive transport mechanism 28 as shown in FIG. 5 having six gripping devices 1 which are arranged on the supporting element 30 radially and concentrically around the center of the supporting element 30 at equidistance from one another.

Figure 7:
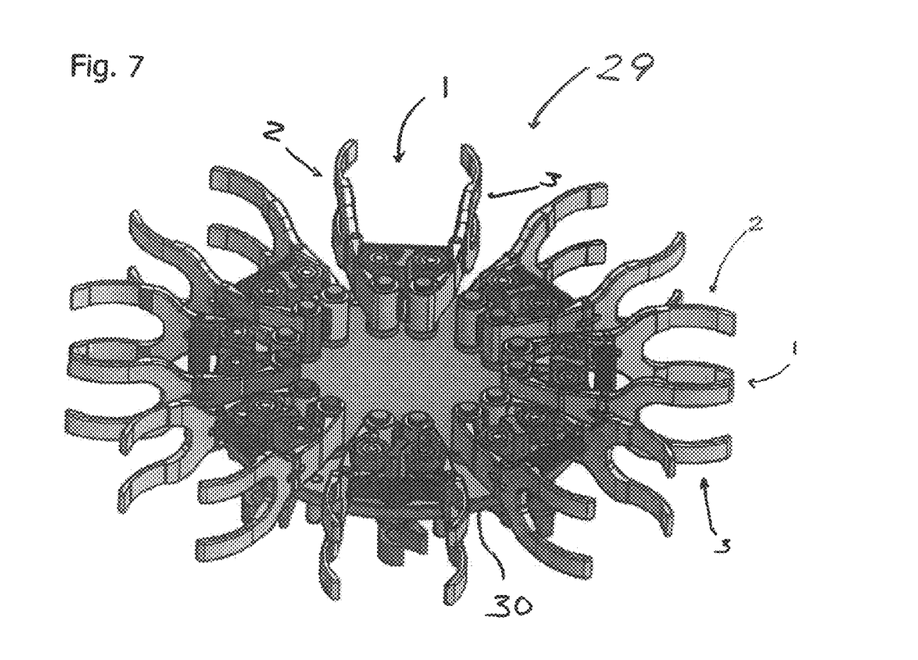
FIG. 7 is a perspective view of a second transport mechanism having eight gripping devices.

FIG. 7 depicts a second transport mechanism 29 having eight gripping devices 1 comprised of a first inventive gripper arm 2 and a second inventive gripper arm 3. The second inventive transport mechanism 29 only differs from the first transport mechanism 28 in the number of gripping devices 1. Among other things, the supporting element 30 can have a larger diameter than the supporting element of the first inventive transport mechanism 28 in order to accommodate all eight gripping devices 1 on the second transport mechanism 29. Another possibility consists of the supporting elements 30 having the same diameter but the gripping devices 1 of the second transport mechanism 29 having smaller dimensions than those of the first transport mechanism 28.

LIST OF REFERENCE NUMERALS 1 gripping device
2 gripper arm 3 corresponding gripper arm
4 pivot axis of the gripper arm
5 gripping section
8 upper side of gripper arm
9 underside of gripper arm
10 bore hole of gripper arm
11 control cam
12 control axis
13 activation element
14 first locating pin of the gripper arm
15 second locating pin of the gripper arm
16 first seating collar
17 second seating collar
18 seating
19 spring
20 toothed section
21 tooth
22 first seating hole
23 second seating hole
24 first gripper finger of the gripper arm
25 second gripper finger of the gripper arm
26 third gripper finger of the gripper arm
28 first transport mechanism
29 second transport mechanism
30 supporting element
32 bearing pin
34 rotational axis of the supporting element

What is claimed is:

1. A gripper arm for a gripping device for grasping, holding and guiding containers, wherein the gripper arm can be moved from at least one first position that is a gripping position, into at least one second position that is an open position, and/or vice versa by a control cam, or rotation of the control cam respectively, the gripper arm comprising:
   at least one bore hole for at least partially receiving a bearing pin, wherein the bearing pin is designed such that the gripper arm can pivot to be pivotably mounted in the gripping device;
   at least one seating for a closing means, wherein the closing means is configured such that the closing means can move the gripper arm from the second position that is the open position, into the first position that is the gripping position, and/or vice versa; and
   at least one gripping section which is at least partially of fork-like form and comprises at least two gripper fingers designed and configured so as to be capable of and can serve in holding a container in the gripping position,
   whereby the gripper arm is arrangeable to interact with the control cam between the at least one bore hole and the at least one seating.

2. The gripper arm according to claim 1, further comprising:
   at least one first hole as at least one seating for the closing means between the at least one bore hole and the at least one gripping section into which the closing means can be inserted during assembly of the gripper arm.

3. The gripper arm according to claim 2, wherein the closing means comprises at least one tension spring.

4. The gripper arm according to claim 3, wherein the at least one seating is designed as a spring seat and comprises at least one second hole arranged perpendicular to the first hole into which a locking element for locking the at least one tension spring in the at least one first hole can be inserted.

5. The gripper arm according to claim 1 wherein the gripper arm is of one-piece plastic manufacture from fiber-reinforced polyether ether ketone, and/or that at least two gripper fingers of the at least one gripping section are arranged parallel to one another.

6. The gripper arm according to claim 1 wherein the gripper arm comprises at least two locating pins arranged on one inner side of the gripper arm between the at least one bore hole and the at least one gripping section for the rotatable mounting of at least one seating collar each which can cooperate with the control cam in the conveying from the gripping position into the open position.

7. The gripper arm according to claim 1 wherein the gripper arm comprises at least one toothed section having at least segments of teeth arranged concentrically around the at least one bore hole on the inner side of the gripper arm for synchronously pivoting the gripper arm with a correspondingly arranged gripper arm in the device.

8. The gripper arm according to claim 1 wherein the gripper arm is part of a gripping device, wherein the gripping device is a gripping device for grasping, holding and/or guiding of containers, wherein the gripping device comprises at least one rotatably mounted control cam, wherein the control cam is designed and disposed such that the gripper arm can be moved from at least one first position, particularly a gripping position, into at least one second position, particularly an open position, and/or vice versa by the control cam or the rotation of the control cam respectively.

9. The gripper arm according to claim 8, wherein the gripping device exhibits a pair of gripper arms comprising at least two gripper arms, wherein at least two complementary gripper arms form a pair of gripper arms and/or that the at least one control cam is arranged between at least two seatings of the gripper arm pair.

10. The gripper arm according to claim 8, wherein the gripping device is part of a transport mechanism for transporting containers.

11. The gripper arm according to claim 10, wherein the transport mechanism is designed such that at least one further transport mechanism can be attached or positively connected.

12. The gripper arm according to claim 11, wherein at least one control cam of the transport mechanism can be coupled, plugged into or attached to at least one control cam of the at least one further transport mechanism by at least one plug-in element.

13. The gripper arm according to claim 11 wherein the transport mechanism comprises at least one bearing pin and a central rotational axis for rotating the transport mechanism, wherein the at least one bearing pin and/or the rotational axis is/are designed to operatively connect to the at least one further transport mechanism.

14. The gripper arm according to claim 10, wherein the transport mechanism is part of a transport system comprising a plurality of transport mechanisms, wherein the transport mechanisms are arranged coaxially to one another and/or the stacked control cams have a common cam shaft.

15. The gripper arm according to claim 14, wherein each transport mechanism includes at least one carrier plate of like and/or different diameters.

* * * * *

UNITED STATES PATENT AND TRADEMARK OFFICE
CERTIFICATE OF CORRECTION

Page 1 of 1

PATENT NO. : 9,193,538 B2
APPLICATION NO. : 14/186692
DATED : November 24, 2015
INVENTOR(S) : Elmar Ludwig Schulnig It is certified that error appears in the above-identified patent and that said Letters Patent is hereby corrected as shown below:

In the Specification:

Col. 1, line 8 should read:
which is incorporated by reference herein in its entirety Col. 6, line 11 should read:
tic in one piece in an injection molding process and completed Col. 8, line 6 should read:
the center of a supporting element 30. The supporting ele- Signed and Sealed this
Twenty-ninth Day of March, 2016

Michelle K. Lee
*Director of the United States Patent and Trademark Office*